United States Patent
Ku et al.

(10) Patent No.: US 8,988,915 B2
(45) Date of Patent: Mar. 24, 2015

(54) DC TO AC CONVERTER

(75) Inventors: Chen-Wei Ku, Taoyuan Hsien (TW); Lei-Ming Lee, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 518 days.

(21) Appl. No.: 13/351,233

(22) Filed: Jan. 17, 2012

(65) Prior Publication Data

US 2013/0016543 A1    Jan. 17, 2013

(30) Foreign Application Priority Data

Jul. 13, 2011    (TW) .............................. 100124760 A

(51) Int. Cl.
*H02M 7/537*    (2006.01)
*H02M 7/5387*    (2007.01)

(52) U.S. Cl.
CPC ................................. *H02M 7/53871* (2013.01)
USPC ................................ 363/132; 363/71; 363/98

(58) Field of Classification Search
USPC .................................. 363/71, 97, 98, 131, 132
See application file for complete search history.

(56) References Cited

U.S. PATENT DOCUMENTS

| | | | |
|---|---|---|---|
| 5,260,864 A | 11/1993 | Simonelli et al. | |
| 6,608,401 B1 | 8/2003 | Walter | |
| 7,046,534 B2 * | 5/2006 | Schmidt et al. | 363/132 |
| 8,593,844 B2 * | 11/2013 | Nishio | 363/97 |
| 2003/0090912 A1 * | 5/2003 | Zubieta | 363/17 |
| 2005/0286281 A1 * | 12/2005 | Victor et al. | 363/131 |
| 2008/0304301 A1 * | 12/2008 | Nishio et al. | 363/132 |
| 2009/0316458 A1 * | 12/2009 | Gonzalez Senosiain et al. | 363/132 |
| 2011/0128763 A1 * | 6/2011 | Iwata et al. | 363/98 |
| 2011/0255316 A1 * | 10/2011 | Burger et al. | 363/98 |

FOREIGN PATENT DOCUMENTS

| | | |
|---|---|---|
| CN | 100384072 C | 4/2008 |
| CN | 101420127 A | 4/2009 |
| TW | 220018 B | 2/1994 |
| TW | 200843302 A | 11/2008 |
| WO | WO 2008102552 A1 * | 8/2008 |

* cited by examiner

*Primary Examiner* — Fred E Finch, III
(74) *Attorney, Agent, or Firm* — CKC & Partners Co., Ltd.

(57) ABSTRACT

A DC to AC converter includes a first switch, a second switch, a first half bridge inverter, and a second half bridge inverter. The first switch includes a first terminal and a second terminal. The second switch includes a first terminal and a second terminal. A portion between the first terminal of the first switch and the first terminal of the second switch is operable to receive a direct current power source. The first half bridge inverter includes a first terminal, a second terminal, and an output terminal. The second half bridge inverter includes a first terminal, a second terminal, and an output terminal. A portion between the output terminal of the first half bridge inverter and the output terminal of the second half bridge inverter is operable to output an alternative current.

17 Claims, 3 Drawing Sheets

DC TO AC CONVERTER

RELATED APPLICATIONS

This application claims priority to Taiwan Application Serial Number 100124760, filed Jul. 13, 2011, which is herein incorporated by reference.

BACKGROUND

1. Field of Invention

The embodiment of the present invention relates generally to a converter and, more particularly, to a DC to AC converter.

2. Description of Related Art

In recent years, demands for more convenient, robust and economical goods continue to rise with the advancement and progress of industry and social-economic. As such, products with more economic values are being developed to meet these and other needs.

When a conventional full bridge inverter is used in a non-isolation photovoltaic grid-connected system, there are several defects in PWM modulation of the full bridge inverter: when a PWM modulation mode of the inverter adopts a bipolar switching mode, the switching loss of the inverter is high, and the efficiency of the inverter is low. In addition, when the PWM modulation mode of the inverter adopts a unipolar switching mode, the leakage current of the inverter is high.

In order to solve the aforementioned problems, those skilled in the art are striving to find a solution, but no applicable method has yet been put forward. Therefore, there is a need to improve the problem of high switching loss and low efficiency due to the inverter adopting the bipolar switching mode and to improve the problem of high leakage current due to the inverter adopting the unipolar switching mode.

SUMMARY

A DC to AC converter is provided for improving the problem of high switching loss and low efficiency due to the inverter adopting the bipolar switching mode and improving the problem of high leakage current due to the inverter adopting the unipolar switching mode.

Thus, one aspect of embodiments of the present invention is to provide a DC to AC converter. The DC to AC converter comprises a first switch, a second switch, a first half bridge inverter, and a second half bridge inverter. The first switch comprises a first terminal and a second terminal. The second switch comprises a first terminal and a second terminal. A portion between the first terminal of the first switch and the first terminal of the second switch is operable to receive a direct current power source. The first half bridge inverter comprises a first terminal, a second terminal, and an output terminal. The first terminal of the first half bridge inverter is electrically connected to the second terminal of the first switch, and the second terminal of the first half bridge inverter is electrically connected to the second terminal of the second switch. The second half bridge inverter comprises a first terminal, a second terminal, and an output terminal. The first terminal of the second half bridge inverter is electrically connected to the second terminal of the first switch, and the second terminal of the second half bridge inverter is electrically connected to the second terminal of the second switch. A portion between the output terminal of the first half bridge inverter and the output terminal of the second half bridge inverter is operable to output an alternative current power source.

In one embodiment of the present invention, the first half bridge inverter comprises a third switch and a fourth switch. The third switch comprises a first terminal and a second terminal. The first terminal of the third switch is the first terminal of the first half bridge inverter. The fourth switch comprises a first terminal and a second terminal. The first terminal of the fourth switch is electrically connected to the second terminal of the third switch, and the second terminal of the fourth switch is the second terminal of the first half bridge inverter. The second terminal of the third switch and the first terminal of the fourth switch are connected at a first node, and the first node is the output terminal of the first half bridge inverter.

In another embodiment of the present invention, the second half bridge inverter comprises a fifth switch and a sixth switch. The fifth switch comprises a first terminal and a second terminal. The first terminal of the fifth switch is the first terminal of the second half bridge inverter. The sixth switch comprises a first terminal and a second terminal. The first terminal of the sixth switch is electrically connected to the second terminal of the fifth switch, and the second terminal of the sixth switch is the second terminal of the second half bridge inverter. The second terminal of the fifth switch and the first terminal of the sixth switch are connected at a second node, and the second node is the output terminal of the second half bridge inverter.

In yet another embodiment of the present invention, the DC to AC converter further comprises a first capacitor and a second capacitor. The first capacitor comprises a first terminal and a second terminal. The first terminal of the first capacitor is electrically connected to the first terminal of the first switch. The second capacitor comprises a first terminal and a second terminal. The first terminal of the second capacitor is electrically connected to the second terminal of the first capacitor, and the second terminal of the second capacitor is electrically connected to the first terminal of the second switch.

In still another embodiment of the present invention, the DC to AC converter further comprises a first inductor and a second inductor. The first inductor comprises a first terminal and a second terminal. The first terminal of the first inductor is electrically connected to the output terminal of the first half bridge inverter. The second inductor comprises a first terminal and a second terminal. The first terminal of the second inductor is electrically connected to the output terminal of the second half bridge inverter.

In yet another embodiment of the present invention, the DC to AC converter further comprises a third capacitor and a fourth capacitor. The third capacitor comprises a first terminal and a second terminal. The first terminal of the third capacitor is electrically connected to the second terminal of the first inductor, and the second terminal of the third capacitor is electrically connected to the second terminal of the first capacitor. The fourth capacitor comprises a first terminal and a second terminal. The first terminal of the fourth capacitor is electrically connected to the first terminal of the second capacitor, and the second terminal of the fourth capacitor is electrically connected to the second terminal of the second inductor. The second terminal of the first inductor and the first terminal of the third capacitor are connected at a third node, and the second terminal of the second inductor and the second terminal of the fourth capacitor are connected at a fourth node, and thereby the portion between the third node and the fourth node is operable to output the alternative current power source.

In still another embodiment of the present invention, the first switch is operable to receive a first switch signal, and the second switch is operable to receive a second switch signal. The first switch and the second switch are controlled by the first switch signal and the second switch signal respectively, and thereby the first switch and the second switch are turned on or turned off simultaneously.

In yet another embodiment of the present invention, the third switch is operable to receive a third switch signal, and the fourth switch is operable to receive a fourth switch signal. The third switch and the fourth switch are controlled by the third switch signal and the fourth switch signal respectively, and thereby the third switch is turned on when the fourth switch is turned off.

In still another embodiment of the present invention, the first switch signal, the second switch signal, and the third switch signal are generated by comparing a first reference voltage and a triangle wave, and when the first reference voltage is at a positive half period, the first switch, the second switch, and the third switch are controlled by the first switch signal, the second switch signal, and the third switch signal respectively, and thereby the first switch, the second switch, and the third switch are turned on or turned off simultaneously.

In yet another embodiment of the present invention, the fifth switch is operable to receive a fifth switch signal, and the sixth switch is operable to receive a sixth switch signal. The fifth switch and the sixth switch are controlled by the fifth switch signal and the sixth switch signal respectively, and thereby the fifth switch is turned on when the sixth switch is turned off.

In still another embodiment of the present invention, the fifth switch signal is generated by comparing a second reference voltage with the triangle wave, and a phase difference between the second reference voltage and the first reference voltage is 180 degrees. When the first reference voltage is at a negative half period, the first switch, the second switch, and the fifth switch are controlled by the first switch signal, the second switch signal, and the fifth switch signal respectively, and thereby the first switch, the second switch, and the fifth switch are turned on or turned off simultaneously.

In another aspect, the embodiment of the present invention provides a DC to AC converter. The DC to AC converter comprises a first switch, a second switch, a first half bridge inverter, and a second half bridge inverter. The first switch is operable to receive a first switch signal for performing switching based on the first switch signal. The second switch is operable to receive a second switch signal for performing switching based on the second switch signal. The first half bridge inverter transforms a direct current power source into an output power source and provides the output power source to an alternating current power source. The second half bridge inverter transforms the direct current power source into an output power source and provides the output power source to the alternating current power source.

In addition, the first half bridge inverter comprises a third switch, a fourth switch, and a first output terminal. The third switch is electrically connected to the first switch, and the third switch receives a third switch signal for performing switching based on the third switch signal. The fourth switch is electrically connected to the third switch and the second switch. The fourth switch and the third switch are connected at a first node, and the fourth switch receives a fourth switch signal for performing switching based on the fourth switch signal. The first output terminal is electrically connected to the first node for outputting the output power source. The second half bridge inverter comprises a fifth switch, a sixth switch, and a second output terminal. The fifth switch is electrically connected to the first switch, and the fifth switch receives a fifth switch signal for performing switching based on the fifth switch signal. The sixth switch is electrically connected to the fifth switch and the second switch. The sixth switch and the fifth switch are connected at a second node, and the sixth switch receives a sixth switch signal for performing switching based on the sixth switch signal. The second output terminal is electrically connected to the second node for outputting the output power source.

In one embodiment of the present invention, the first switch and the second switch are controlled by the first switch signal and the second switch signal respectively, and thereby the first switch and the second switch are turned on or turned off simultaneously.

In another embodiment of the present invention, the third switch and the fourth switch are controlled by the third switch signal and the fourth switch signal respectively, and thereby the third switch is turned on when the fourth switch is turned off.

In yet another embodiment of the present invention, the first switch signal, the second switch signal, and the third switch signal are generated by comparing a first reference voltage with a triangle wave, and when the first reference voltage is at a positive half period, the first switch, the second switch, and the third switch are controlled by the first switch signal, the second switch signal, and the third switch signal respectively, and thereby the first switch, the second switch, and the third switch are turned on or turned off simultaneously.

In still another embodiment of the present invention, the fifth switch and the sixth switch are controlled by the fifth switch signal and the sixth switch signal respectively, and thereby the fifth switch is turned on when the sixth switch is turned off.

In yet another embodiment of the present invention, the fifth switch signal is generated by comparing a second reference voltage with the triangle wave, and a phase difference between the second reference voltage and the first reference voltage is 180 degrees. When the first reference voltage is at a negative half period, the first switch, the second switch, and the fifth switch are controlled by the first switch signal, the second switch signal, and the fifth switch signal respectively, and thereby the first switch, the second switch, and the fifth switch are turned on or turned off simultaneously.

In still another embodiment of the present invention, the DC to AC converter further comprises a first inductor capacitor filter circuit. The first inductor capacitor filter circuit is electrically connected to the first output terminal of the first half bridge inverter for filtering the output power source.

In yet another embodiment of the present invention, the DC to AC converter further comprises a second inductor capacitor filter circuit. The second inductor capacitor filter circuit is electrically connected to second output terminal of the second half bridge inverter for filtering the output power source.

In summary, the DC to AC converter is provided to improve the problem of high switching loss and low efficiency caused by the inverter adopting the bipolar switching mode and to improve the problem of high leakage current caused by the inverter adopting the unipolar switching mode.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
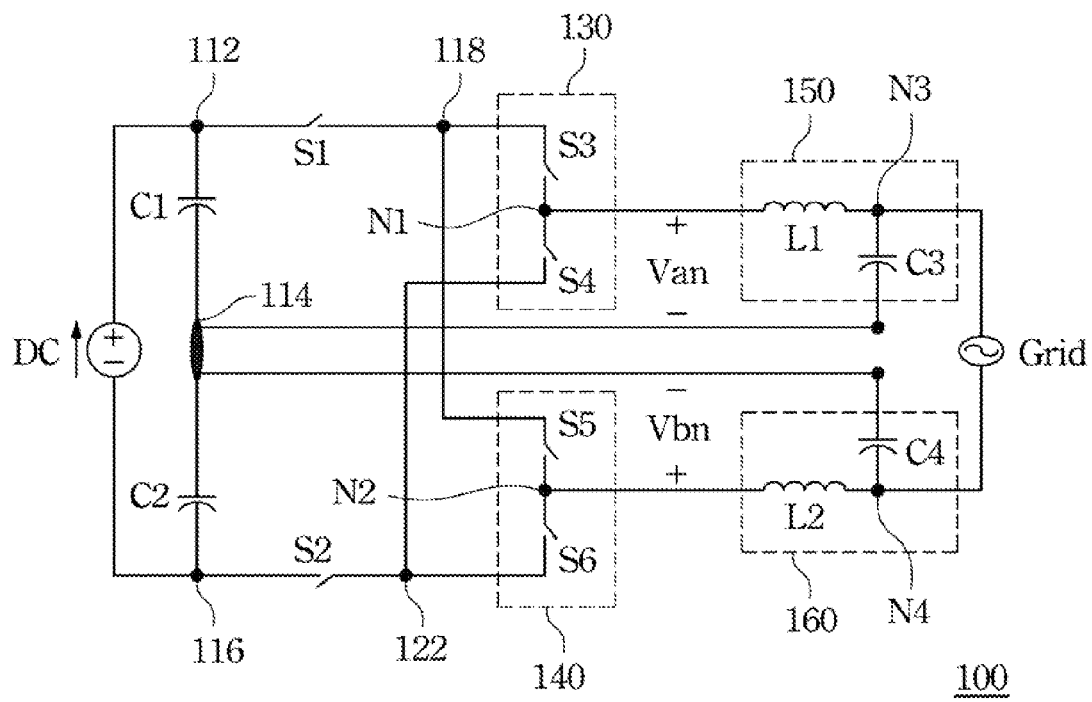
FIG. 1 shows schematically a circuit diagram of a DC to AC converter according to one embodiment of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

As used herein, the terms "comprising," "including," "having," "containing," "involving," and the like are to be understood to be open-ended, i.e., to mean including but not limited to.

FIG. 1 shows schematically a circuit diagram of a DC to AC converter 100 according to one embodiment of the present invention.

As shown in FIG. 1, the DC to AC converter 100 comprises a first switch S1, a second switch S2, a first half bridge inverter 130, and a second half bridge inverter 140. The first switch S1 comprises a first terminal 112 and a second terminal 118. The second switch S2 comprises a first terminal 116 and a second terminal 122. A portion between the first terminal 112 of the first switch S1 and the first terminal 116 of the second switch is operable to receive a direct current power source.

It is noted that, for brief explanation, there are two terminals of different elements connected at the same terminal so that there is a same reference sign used by the two terminals of different elements. For one single element, the two terminals of the same element are labeled with different reference numbers. However, when two elements are connected at the same point, the connected terminal of the first element and the connected terminal of the second element share with the same reference sign. For example, when only a first capacitor C1 is considered, it has a first terminal 112, and a second terminal 114. When the first capacitor C1 and the first switch S1 are considered, the connected point of the first capacitor C1 and the first switch S1 is the terminal 112. In this condition, the terminal 112 is referred to as the first terminal of the first capacitor C1, and the terminal 112 is also referred to as the first terminal of the first switch S1. The above-mentioned descriptions are merely expressed differently, and do not caused any difference in understanding the connection relationships among the elements so that those skilled in the art can understand such descriptions.

In this embodiment, the first half bridge inverter 130 comprises a first terminal 118, a second terminal 122, and an output terminal N1. The first terminal 118 of the first half bridge inverter 130 is electrically connected to the second terminal 118 of the first switch S1, and the second terminal 122 of the first half bridge inverter 130 is electrically connected to the second terminal 122 of the second switch S2.

In addition, the second half bridge inverter 140 comprises a first terminal 118, a second terminal 122, and an output terminal N2. The first terminal 118 of the second half bridge inverter 140 is electrically connected to the second terminal 118 of the first switch S1, and the second terminal 122 of the second half bridge inverter 140 is electrically connected to the second terminal 122 of the second switch S2. A portion between the output terminal N1 of the first half bridge inverter 130 and the output terminal N2 of the second half bridge inverter 140 is operable to output an alternating current power source.

The first half bridge inverter 130 transforms the direct current power source DC into an output power source, and the output power source is provided to the alternating current power source through the output terminal N1 of the first half bridge inverter 130. The second half bridge inverter 140 transforms the direct current power source DC into an output power source, and the output power source is provided to the alternating current power source through the output terminal N2 of the second half bridge inverter 140.

In another embodiment, the first half bridge inverter 130 comprises a third switch S3 and a fourth switch S4. The third switch S3 comprises a first terminal 118 and a second terminal N1. The first terminal 118 of the third switch S3 is the first terminal 118 of the first half bridge inverter 130. The fourth switch S4 comprises a first terminal N1 and a second terminal 122. The first terminal N1 of the fourth switch S4 is electrically connected to the second terminal N1 of the third switch S3, and the second terminal 122 of the fourth switch S4 is the second terminal 122 of the first half bridge inverter 130. The second terminal N1 of the third switch S3 and the first terminal N1 of the fourth switch S4 are connected at the first node N1, and the first node N1 is the output terminal N1 of the first half bridge inverter 130.

In an optional embodiment, the second half bridge inverter 140 comprises a fifth switch S5 and a sixth switch S6. The fifth switch S5 comprises a first terminal 118 and a second terminal N2. The first terminal 118 of the fifth switch S5 is the first terminal 118 of the second half bridge inverter 140. The sixth switch S6 comprises a first terminal N2 and a second terminal 122. The first terminal N2 of the sixth switch S6 is electrically connected to the second terminal N2 of the fifth switch S5, and the second terminal 122 of the sixth switch S6 is the second terminal 122 of the second half bridge inverter 140. The second terminal N2 of the fifth switch S5 and the first terminal N2 of the sixth switch S6 are connected at the second node N2, and the second node N2 is the output terminal N2 of the second half bridge inverter 140.

In yet another embodiment, the DC to AC converter 100 further comprises a first capacitor C1 and a second capacitor C2. The first capacitor C1 comprises a first terminal 112 and a second terminal 114. The first terminal 112 of the first capacitor C1 is electrically connected to the first terminal 112 of the first switch S1. The second capacitor C2 comprises a first terminal 114 and a second terminal 116. The first terminal 114 of the second capacitor C2 is electrically connected to the second terminal 114 of the first capacitor C1, and the second terminal 116 of the second capacitor C2 is electrically connected to the first terminal 116 of the second switch S2.

In still another embodiment, the DC to AC converter 100 further comprises a first inductor L1 and a second inductor L2. The first inductor L1 comprises a first terminal N1 and a second terminal N3. The first terminal N1 of the first inductor L1 is electrically connected to the output terminal N1 of the first half bridge inverter 130. The second inductor L2 comprises a first terminal N2 and a second terminal N4. The first terminal N2 of the second inductor L2 is electrically connected to the output terminal N2 of the second half bridge inverter 140.

In yet another embodiment, the DC to AC converter 100 further comprises a third capacitor C3 and a fourth capacitor C4. The third capacitor C3 comprises a first terminal N3 and second terminal 114. The first terminal N3 of the third capacitor C3 is electrically connected to the second terminal N3 of the first inductor L1, and the second terminal 114 of the third capacitor C3 is electrically connected to the second terminal 114 of the first capacitor C1. The fourth capacitor C4 comprises a first terminal 114 and a second terminal N4. The first terminal 114 of the fourth capacitor C4 is electrically connected to the first terminal 114 of the second capacitor C2, and the second terminal N4 of the fourth capacitor C4 is electrically connected to the second terminal N4 of the second inductor L2. The second terminal N3 of the first inductor L1 and the first terminal N3 of the third capacitor C3 are connected at the third node N3, and the second terminal N4 of the second inductor L2 and the second terminal N4 of the fourth capacitor C4 are connected at the fourth node N4, and thereby a portion between the third node N3 and the fourth node N4 is operable to output the alternative current power source.

In operation, the first inductor L1 and the third capacitor C3 form a first inductor capacitor filter circuit 150. The first inductor capacitor filter circuit 150 is electrically connected to the output terminal N1 of the first half bridge inverter 130, and the first inductor capacitor filter circuit 150 filters the output power source outputted from the output terminal N1 of the first half bridge inverter 130.

In addition, the second inductor L2 and the fourth capacitor C4 form a second inductor capacitor filter circuit 160. The second inductor capacitor filter circuit 160 is electrically connected to the output terminal N2 of the second half bridge inverter 140, and the second inductor capacitor filter circuit 160 filters the output power source outputted from the output terminal N2 of the second half bridge inverter 140.

Figure 2:
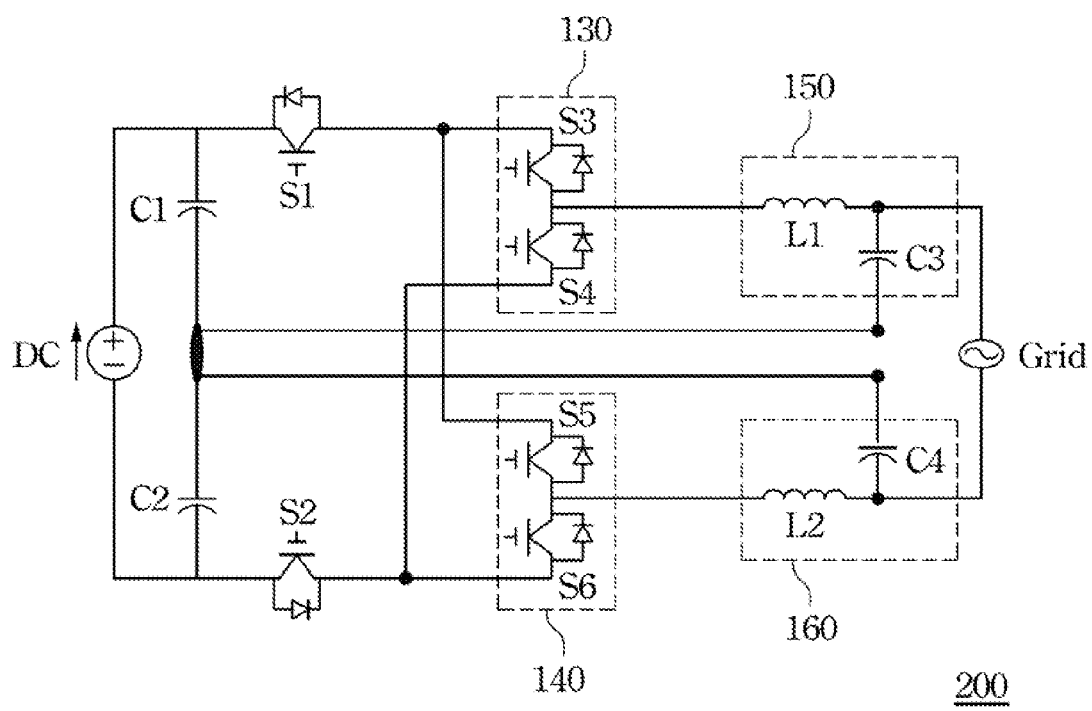
FIG. 2 shows schematically a circuit diagram of a DC to AC converter according to another embodiment of the present invention.

FIG. 2 shows schematically a circuit diagram of a DC to AC converter 200 according to another embodiment of the present invention. As shown in FIG. 2, the first to sixth switches S1~S6 of the embodiment of the present invention can be power switches, for example, BJTs (Bipolar Junction Transistors), MOSFETs (MOS Field-Effect Transistors), IGBTs (Insulated Gate Bipolar Transistors), and so on. However, the scope of the present invention is not intended to be limited to the embodiment, and those skilled in the art may selectively adopt an appropriate element as the switch element.

It is noted that the DC to AC converters 100 and 200 as shown in FIGS. 1 and 2 are formed by connecting the first half bridge inverter 130 and the second half bridge inverter 140 in series. Since the output of the half-bridge inverter is half as much as the input of the half-bridge inverter when the DC to AC converters 100 and 200 adopt only one half-bridge inverter, there is a need to adopt two half bridge inverters connected in series in the DC to AC converters 100 and 200 to transform the direct current into the alternating current, thereby outputting a complete voltage.

Figure 3:
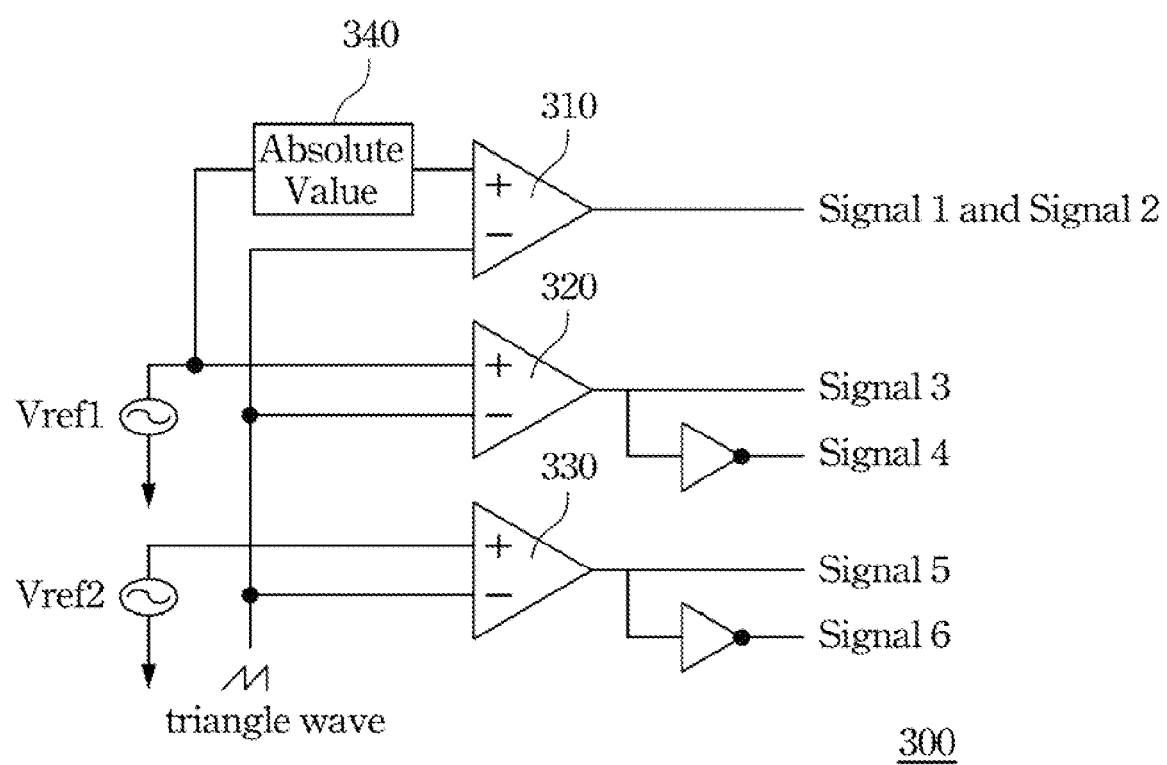
FIG. 3 shows schematically a diagram of a driving signal generating structure according to another embodiment of the present invention.

FIG. 3 shows schematically a diagram of a driving signal generating structure 300 according to another embodiment of the present invention.

Referring to FIG. 3, a driving signal generating structure 300 comprises a first comparator 310, a second comparator 320, a third comparator 330, and a absolute value encoder 340. The non-inverting terminal of the first comparator 310 is electrically connected to the first reference voltage source Vref1 through the absolute value encoder 340. The inverting terminal of the first comparator 310 receives a triangle wave Vtri, and the first comparator 310 compares the first reference voltage source Vref1 with the triangle wave Vtri to output the first switch signal Signal 1 and the second switch signal Signal 2.

In addition, the non-inverting terminal of the second comparator 320 is electrically connected to the first reference voltage source Vref1. The inverting terminal of the second comparator 320 receives the triangle wave Vtri, and the second comparator 320 compares the first reference voltage source Vref1 and the triangle wave Vtri to output a first output signal. The first output signal is the third switch signal Signal 3, and the first output signal is transformed into a fourth switch signal Signal 4 by the inverter.

Furthermore, the non-inverting terminal of the third comparator 330 is electrically connected to the second reference voltage source Vref2. The inverting terminal of the third comparator 330 receives the triangle wave Vtri, and the third comparator 330 compares the second reference voltage source Vref2 with the triangle wave Vtri to output a second output signal. The second output signal is the fifth switch signal Signal 5, and the second output signal is transformed into a sixth switch signal Signal 6 by the inverter. A phase difference between the second reference voltage Vsin2 provided by the second reference voltage source Vref2 and the first reference voltage Vsin1 provided by the first reference voltage source Vref1 is 180 degrees.

Figure 4:
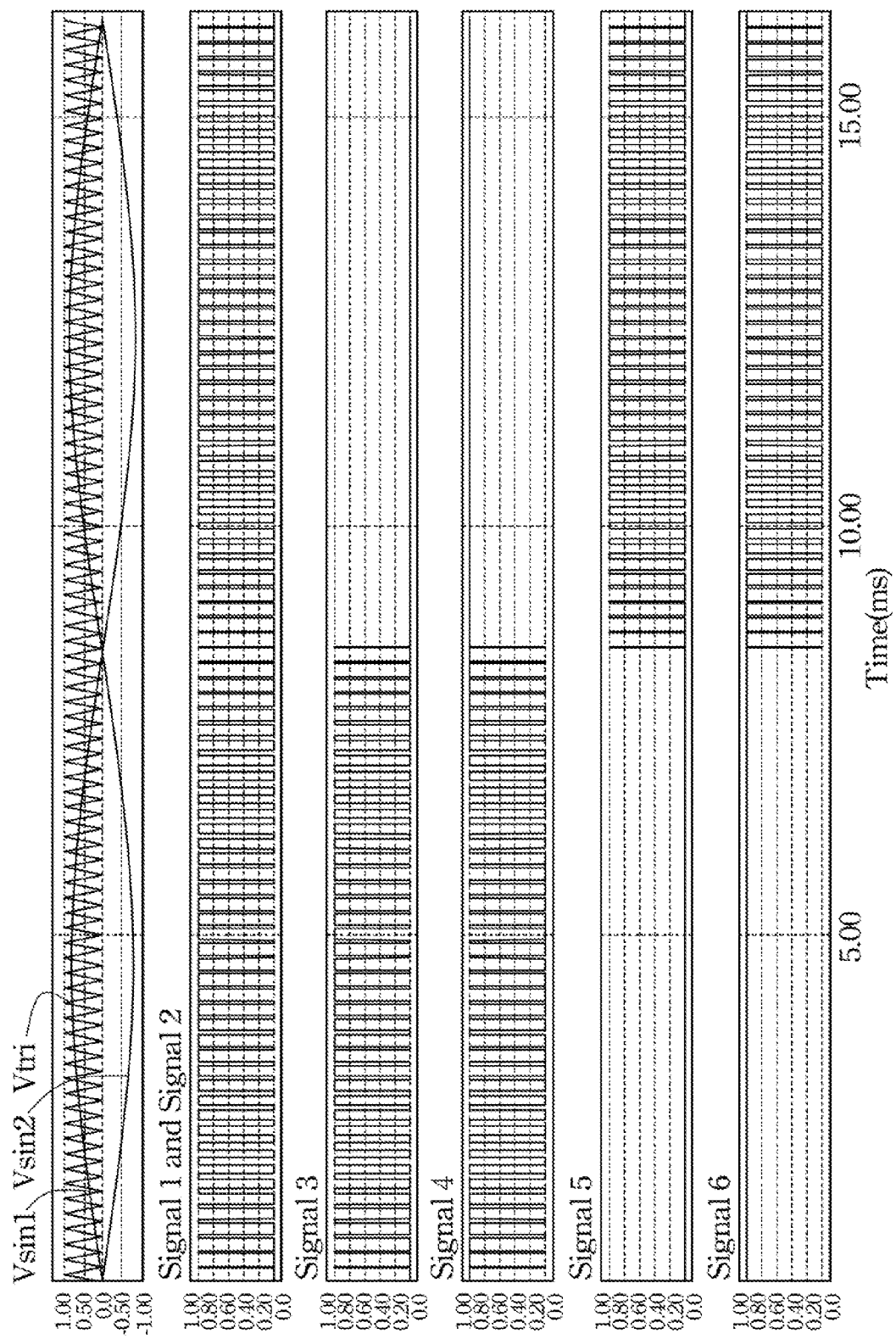
FIG. 4 shows schematically a waveform diagram of a switch signal according to FIG. 3 of the present invention.

The wave shapes of the first to the sixth switch signals Signal 1~Signal 6 outputted by the driving signal generating structure 300 as shown in FIG. 3 are shown in FIG. 4. The first to sixth switches S1~S6 of the DC to AC converters 100 and 200 in FIG. 1 and FIG. 2 of the present invention are controlled by the first to sixth switch signals Signal 1~Signal 6.

Referring to both FIG. 1 and FIG. 4, in an optional embodiment, the first switch S1 receives the first switch signal Signal 1 for perform switching based on the first switch signal Signal 1, and the second switch S2 receives the second switch signal Signal 2 for perform switching based on the second switch signal Signal 2. The first switch S1 and the second switch S2 are controlled by the first switch signal Signal 1 and the second switch signal Signal 2 respectively, and thereby the first switch S1 and the second switch S2 are turned on or turned off simultaneously.

In yet another embodiment, the third switch S3 receives a third switch signal Signal 3 for perform switching based on the third switch signal Signal 3, and the fourth switch S4 receives a fourth switch signal Signal 4 for perform switching based on the fourth switch signal Signal 4. The third switch S3 and the fourth switch S4 are controlled by the third switch signal Signal 3 and the fourth switch signal Signal 4 respectively, and thereby the third switch S3 is turned on when the fourth switch S4 is turned off, and the third switch S3 is turned off when the fourth switch S4 is turned on.

In still another embodiment, the first switch signal Signal 1, the second switch signal Signal 2, and the third switch signal Signal 3 are generated by comparing a first reference voltage Vsin1 with a triangle wave Vtri, and when the first reference voltage Vsin1 is at a positive half period, the first switch S1, the second switch S2, and the third switch S3 are controlled by the first switch signal Signal 1, the second switch signal Signal 2, and the third switch signal Signal 3 respectively, and thereby the first switch S1, the second switch S2, and the third switch S3 are turned on or turned off simultaneously.

In yet another embodiment, the fifth switch S5 receives the fifth switch signal Signal 5 for perform switching based on the fifth switch signal Signal 5, and the sixth switch S6 receives a sixth switch signal Signal 6 for perform switching based on the sixth switch signal Signal 6. The fifth switch S5 and the sixth switch S6 are controlled by the fifth switch signal Signal 5 and the sixth switch signal Signal 6 respectively, and thereby the fifth switch S5 is turned on when the sixth switch S6 is turned off, and, the fifth switch S5 is turned off when the sixth switch S6 is turned on.

In an optional embodiment, the fifth switch signal Signal 5 is generated by comparing a second reference voltage Vsin2 with the triangel wave Vtri. When the first reference voltage Vsin1 is at a negative half period, the first switch S1, the second switch S2, and the fifth switch S5 are controlled by the first switch signal Signal 1, the second switch signal Signal 2, and the fifth switch signal Signal 5 respectively, and thereby the first switch S1, the second switch S2, and the fifth switch S5 are turned on or turned off simultaneously.

According to the aforementioned driving methods of the embodiments of the present invention, the operation modes of the DC to AC converter 100, 200 are described as follows. The first switch S1, the second switch S2, the third switch S3, and the sixth switch S6 are turned on when the first reference voltage Vsin1 is at positive half period, and meanwhile, the first inductor L1 and the second inductor L2 are charged, and transmit the energy from the input terminal to the output terminal; the current of the inductor flows through the fourth switch S4 (if the fourth switch S4 is an IGBT, the current of the inductor flows through the body diode of the inductor) and sixth switch S6 when the first switch S1, the second switch S2, and the third switch S3 are turned off, thereby continuously transmitting the energy from the input terminal to the output terminal.

Moreover, the first switch S1, the second switch S2, the fourth switch S4, and the fifth switch S5 are turned on when the first reference voltage Vsin1 is at the negative half period, and meanwhile, the first inductor L1 and the second inductor L2 are charged, and transmit the energy from the input terminal to the output terminal; when the first switch S1, the second switch S2, and the fifth switch S5 are turned off, the current of the inductor flows through the sixth switch S6 (if the sixth switch S6 is an IGBT, the current of the inductor flows through the body diode of the capacitor) and fourth switch S4, thereby continuously transmitting the energy from the input terminal to the output terminal.

Referring to FIG. 1, the results of the DC to AC converter 100, 200 adopting the above-mentioned driving method are described as follows: The sum of the values of the Van and Vbn is zero so that the level of generating the leakage current is kept at a constant value. As such, the level of generating the leakage current is not changed with the change of the driving method, and thus the leakage current is reduced. In addition, the DC to AC converters 100 and 200 adopt two half-bridge inverters to operate in a PWM mode, wherein the phase difference between the two half-bridge inverters is 180 degrees. Furthermore, a bypass switch is introduced (the bypass switch of the first half bridge inverter 130 is the first switch S1, and the bypass switch of the second half bridge inverter 140 is the second switch S2) to decrease the switching loss of the inverter.

It can be known from the foregoing embodiments of the present invention, the application of the present invention has the following advantages. By providing a DC to AC converter so as to The embodiments of the present invention improve the problem of high switching loss and low efficiency caused by the inverter adopting the bipolar switching mode, and improve the problem of high leakage current caused by the inverter adopting the unipolar switching mode.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:

1. A DC to AC converter, comprising:
   a first switch comprising a first terminal and a second terminal;
   a second switch comprising a first terminal and a second terminal, wherein a portion between the first terminal of the first switch and the first terminal of the second switch is operable to receive a direct current power source;
   a first half bridge inverter comprising a first terminal, a second terminal, and an output terminal, wherein the first terminal of the first half bridge inverter is electrically connected to the second terminal of the first switch, and the second terminal of the first half bridge inverter is electrically connected to the second terminal of the second switch, wherein the first half bridge inverter comprises a third switch comprising a first terminal and a second terminal, wherein the first terminal of the third switch is the first terminal of the first half bridge inverter; and
   a second half bridge inverter comprising a first terminal, a second terminal, and an output terminal, wherein the first terminal of the second half bridge inverter is electrically connected to the second terminal of the first switch, and the second terminal of the second half bridge inverter is electrically connected to the second terminal of the second switch, wherein a portion between the output terminal of the first half bridge inverter and the output terminal of the second half bridge inverter is operable to output an alternative current power source;
   wherein the first switch is operable to receive a first switch signal, the second switch is operable to receive a second switch signal, and the third switch is operable to receive a third switch signal,
   wherein the first switch signal, the second switch signal, and the third switch signal are generated by comparing a first reference voltage with a triangle wave, and when the first reference voltage is at a positive half period, the first switch, the second switch, and the third switch are controlled by the first switch signal, the second switch signal, and the third switch signal respectively, and thereby the first switch, the second switch, and the third switch are turned on or turned off simultaneously.

2. The DC to AC converter according to claim 1, wherein the first half bridge inverter further comprises:
a fourth switch comprising a first terminal and a second terminal, wherein the first terminal of the fourth switch is electrically connected to the second terminal of the third switch, and the second terminal of the fourth switch is the second terminal of the first half bridge inverter,
wherein the second terminal of the third switch and the first terminal of the fourth switch are connected at a first node, and the first node is the output terminal of the first half bridge inverter.

3. The DC to AC converter according to claim 2, wherein the second half bridge inverter comprises:
a fifth switch comprising a first terminal and a second terminal, wherein the first terminal of the fifth switch is the first terminal of the second half bridge inverter; and
a sixth switch comprising a first terminal and a second terminal, wherein the first terminal of the sixth switch is electrically connected to the second terminal of the fifth switch, and the second terminal of the sixth switch is the second terminal of the second half bridge inverter,
wherein the second terminal of the fifth switch and the first terminal of the sixth switch are connected at a second node, and the second node is the output terminal of the second half bridge inverter.

4. The DC to AC converter according to claim 3, wherein the first switch and the second switch are controlled by the first switch signal and the second switch signal respectively, and thereby the first switch and the second switch are turned on or turned off simultaneously.

5. The DC to AC converter according to claim 4, wherein the fourth switch is operable to receive a fourth switch signal, wherein the third switch and the fourth switch are controlled by the third switch signal and the fourth switch signal respectively, and thereby the third switch is turned on when the fourth switch is turned off.

6. The DC to AC converter according to claim 3, wherein the fifth switch is operable to receive a fifth switch signal, and the sixth switch is operable to receive a sixth switch signal, and the fifth switch and the sixth switch are controlled by the fifth switch signal and the sixth switch signal respectively, and thereby the fifth switch is turned on when the sixth switch is turned off.

7. The DC to AC converter according to claim 6, wherein the fifth switch signal is generated by comparing a second reference voltage with the triangle wave, and a phase difference between the second reference voltage and the first reference voltage is 180 degrees, and when the first reference voltage is at a negative half period, the first switch, the second switch, and the fifth switch are controlled by the first switch signal, the second switch signal, and the fifth switch signal respectively, and thereby the first switch, the second switch, and the fifth switch are turned on or turned off simultaneously.

8. The DC to AC converter according to claim 1, further comprising:
a first capacitor comprising a first terminal and a second terminal, wherein the first terminal of the first capacitor is electrically connected to the first terminal of the first switch; and
a second capacitor comprising a first terminal and a second terminal, wherein the first terminal of the second capacitor is electrically connected to the second terminal of the first capacitor, and the second terminal of the second capacitor is electrically connected to the first terminal of the second switch.

9. The DC to AC converter according to claim 8, further comprising:
a first inductor comprising a first terminal and a second terminal, wherein the first terminal of the first inductor is electrically connected to the output terminal of the first half bridge inverter; and
a second inductor comprising a first terminal and a second terminal, wherein the first terminal of the second inductor is electrically connected to the output terminal of the second half bridge inverter.

10. The DC to AC converter according to claim 9, further comprising:
a third capacitor comprising a first terminal and a second terminal, wherein the first terminal of the third capacitor is electrically connected to the second terminal of the first inductor, and the second terminal of the third capacitor is electrically connected to the second terminal of the first capacitor; and
a fourth capacitor comprising a first terminal and a second terminal, wherein the first terminal of the fourth capacitor is electrically connected to the first terminal of the second capacitor, and the second terminal of the fourth capacitor is electrically connected to the second terminal of the second inductor,
wherein the second terminal of the first inductor and the first terminal of the third capacitor are connected at a third node, and the second terminal of the second inductor and the second terminal of the fourth capacitor are connected at a fourth node, and thereby a portion between the third node and the fourth node is operable to output the alternative current power source.

11. A DC to AC converter, comprising:
a first switch for receiving a first switch signal to perform switching based on the first switch signal;
a second switch for receiving a second switch signal to perform switching based on the second switch signal;
a first half bridge inverter for transforming a direct current power source into an output power source and providing the output power source to an alternating current power source, wherein the first half bridge inverter comprises:
a third switch electrically connected to the first switch for receiving a third switch signal to perform switching based on the third switch signal;
a fourth switch electrically connected to the third switch and the second switch, wherein the fourth switch and the third switch are connected at a first node, and the fourth switch is operable to receive a fourth switch signal for performing switching based on the fourth switch signal; and
a first output terminal electrically connected to the first node for outputting the output power source; and
a second half bridge inverter for transforming the direct current power source into an output power source and providing the output power source to the alternating current power source, wherein the second half bridge inverter comprises:
a fifth switch electrically connected to the first switch for receiving a fifth switch signal to perform switching based on the fifth switch signal;
a sixth switch electrically connected to the fifth switch and the second switch, wherein the sixth switch and the fifth switch are connected at a second node, and the sixth switch is operable to receive a sixth switch signal for performing switching based on the sixth switch signal; and a second output terminal electrically connected to the second node for outputting the output power source, wherein the first switch signal, the second switch signal, and the third switch signal are generated by comparing a first reference voltage with a triangle wave, and when the first reference voltage is at a positive half period, the first switch, the second switch, and the third switch are controlled by the first switch signal, the second switch signal, and the third switch signal respectively, and thereby the first swithc, the second switch, and the third switch are turned on or turned off simultaneously.

12. The DC to AC converter according to claim 11, further comprising:
a first inductor capacitor filter circuit electrically connected to the first output terminal of the first half bridge inverter for filtering the output power source.

13. The DC to AC converter according to claim 11, wherein the first switch and the second switch are controlled by the first switch signal and the second switch signal respectively, and thereby the first switch and the second switch are turned on or turned off simultaneously.

14. The DC to AC converter according to claim 13, wherein the third switch and the fourth switch are controlled by the third switch signal and the fourth switch signal respectively, and thereby the third switch is turned on when the fourth switch is turned off.

15. The DC to AC converter according to claim 11, further comprising:
a second inductor capacitor filter circuit electrically connected to the second output terminal of the second half bridge inverter for filtering the output power source.

16. The DC to AC converter according to claim 11, wherein the fifth switch and the sixth switch are controlled by the fifth switch signal and the sixth switch signal respectively, and thereby the fifth switch is turned on when the sixth switch is turned off.

17. The DC to AC converter according to claim 16, wherein the fifth switch signal is generated by comparing a second reference voltage with the triangle wave, and a phase difference between the second reference voltage and the first reference voltage is 180 degrees, and when the first reference voltage is at a negative half period, the first switch, the second switch, and the fifth switch are controlled by the first switch signal, the second switch signal, and the fifth switch signal respectively, and thereby the first switch, the second switch, and the fifth switch are turned on or turned off simultaneously.

* * * * *